US012240482B2

(12) United States Patent
Banerjee et al.

(10) Patent No.: US 12,240,482 B2
(45) Date of Patent: Mar. 4, 2025

(54) SYSTEM AND METHOD FOR PREVENTING INTERACTIONS BETWEEN VEHICLE AND MOVING OBJECT

(71) Applicant: Ford Global Technologies, LLC, Dearborn, MI (US)

(72) Inventors: Subharthi Banerjee, Dearborn, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/154,805

(22) Filed: Jan. 14, 2023

(65) Prior Publication Data
US 2024/0239365 A1    Jul. 18, 2024

(51) Int. Cl.
*B60W 50/16* (2020.01)
*B60Q 1/32* (2006.01)
(Continued)

(52) U.S. Cl.
CPC ............. *B60W 50/16* (2013.01); *B60Q 1/324* (2022.05); *B60Q 1/525* (2013.01); *E05F 15/40* (2015.01); *E05F 15/73* (2015.01); *H04W 4/40* (2018.02); *H04W 4/90* (2018.02); *B60Q 2400/20* (2013.01); *B60Q 2400/40* (2013.01); *B60W 2050/143* (2013.01); *B60W 2050/146* (2013.01); *B60W 2554/40* (2020.02); *B60W 2556/45* (2020.02)

(58) Field of Classification Search
CPC .......... B60W 50/16; B60W 2050/143; B60W 2050/146; B60W 2554/40; B60W 2556/45; B60Q 1/324; B60Q 1/525; B60Q 2400/20; B60Q 2400/40; E05F 15/40; E05F 15/73; H04W 4/40; H04W 4/90
See application file for complete search history.

(56) References Cited

U.S. PATENT DOCUMENTS

| 9,637,965 B1 | 5/2017 | Kuthari |
| 11,214,194 B2 | 1/2022 | Thorngren et al. |
| (Continued) | | |

FOREIGN PATENT DOCUMENTS

WO    2016012651 A1    1/2016

OTHER PUBLICATIONS

Aoife Glass, This invention Promises to Stop Car Doors Taking Out Cyclists, Bike Radar, Nov. 26, 2015.

*Primary Examiner* — Quan Zhen Wang
*Assistant Examiner* — Rajsheed O Black-Childress
(74) *Attorney, Agent, or Firm* — Emily Drake; Eversheds Sutherland (US) LLP

(57) ABSTRACT

The disclosure is generally directed to systems and methods for preventing doored interactions between a vehicle and moving object. According to one or more embodiments, a method for a vehicle includes detecting that a moving object is approaching the vehicle when the vehicle is stationary, detect that a moving object is approaching the vehicle when the vehicle is stationary, provide an alert within the vehicle of the approaching moving object, prevent an actuation of a door latch from opening a door of the vehicle, and provide a visual alert to notify an operator of the moving object that an occupant of the vehicle is attempting to open the door of the vehicle.

18 Claims, 5 Drawing Sheets

(51) Int. Cl.
  *B60Q 1/50*   (2006.01)
  *B60W 50/14*  (2020.01)
  *E05F 15/40*  (2015.01)
  *E05F 15/73*  (2015.01)
  *H04W 4/40*   (2018.01)
  *H04W 4/90*   (2018.01)

(56) References Cited

U.S. PATENT DOCUMENTS

| | | | |
|---|---|---|---|
| 11,473,353 B2* | 10/2022 | Miyashiro | B60J 5/00 |
| 2013/0107049 A1 | 5/2013 | Lee et al. | |
| 2016/0300473 A1* | 10/2016 | Chen | B60Q 9/008 |
| 2017/0210282 A1* | 7/2017 | Rodriguez Barros | B60Q 1/324 |
| 2019/0139411 A1* | 5/2019 | Dhull | B60Q 1/543 |
| 2022/0080887 A1* | 3/2022 | Ham | B60Q 9/008 |
| 2022/0111792 A1* | 4/2022 | Burmistrov | B60W 30/0956 |
| 2023/0106562 A1* | 4/2023 | Bozich | B60W 30/0953 |
| | | | 340/425.5 |

* cited by examiner

216 Blinking LED indicating AWARENESS MESSAGE

236 AWARENESS MESSAGE acknowledged alert sent to INFORM

SYSTEM AND METHOD FOR PREVENTING INTERACTIONS BETWEEN VEHICLE AND MOVING OBJECT

FIELD OF THE DISCLOSURE

This disclosure generally relates to vehicles and bicycles, and more particularly relates to systems and methods for preventing unwanted interactions between vehicles and moving bicycles or other moving objects.

BACKGROUND

It is difficult for a rider or passenger of a bicycle or scooter to anticipate when a driver or passengers of parked or stopped vehicle may open a vehicle door. In addition, inattentive or harried drivers and passengers of a vehicle may open a door of a vehicle without looking. In addition, in a congested area, rearview mirrors and/or camera data by not be sufficient as the view of a bicyclist or scooter approaching the vehicle from the rear may be obscured.

Thus, it is desirable to provide solutions that address the need for preventing unwanted interactions between vehicles and moving objects, such as bicycles and scooters.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
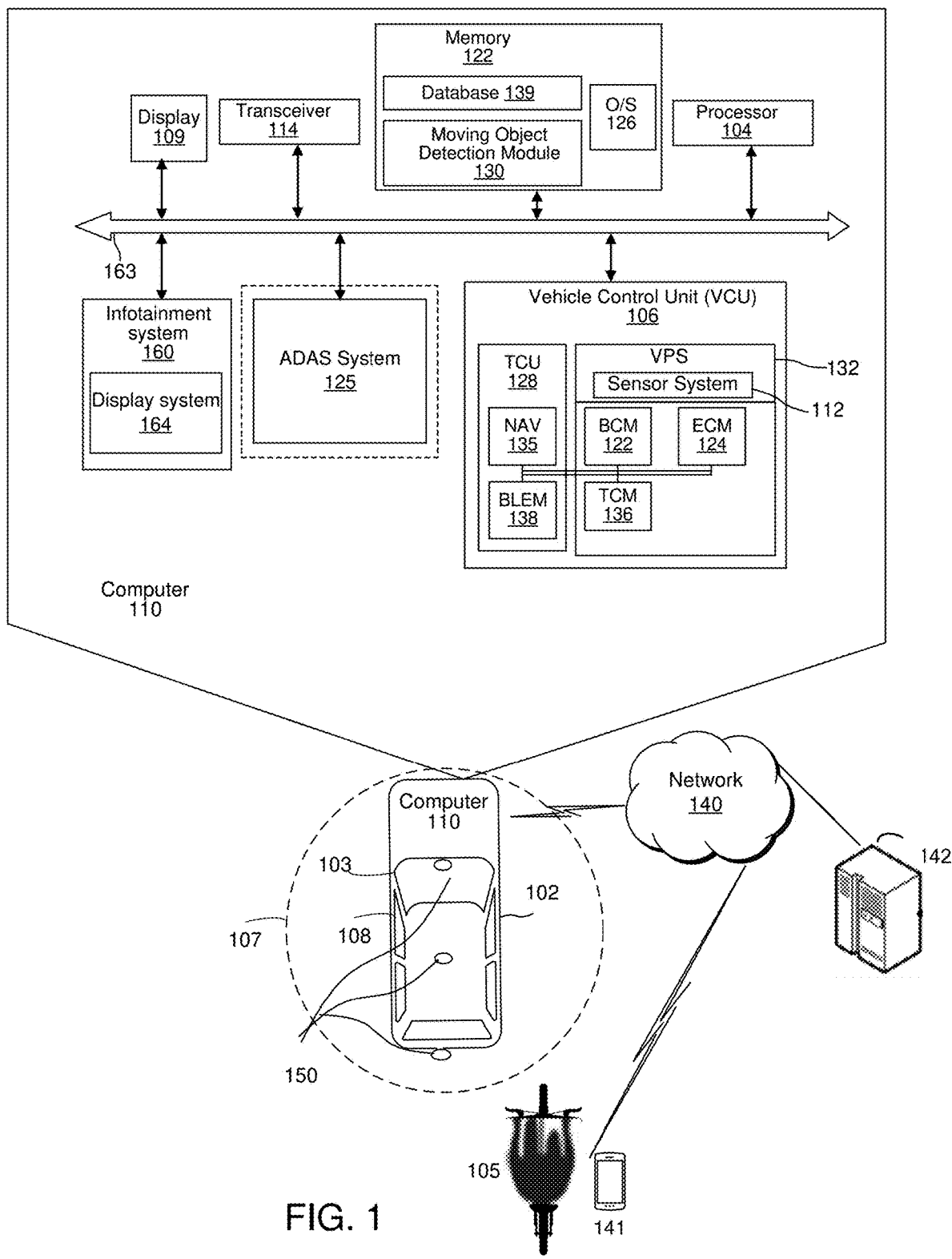
FIG. 1 illustrates an example system that includes a vehicle in accordance with an embodiment of the disclosure.

In terms of a general overview, this disclosure is generally directed to systems and methods for notifying an approaching moving object such as a bicyclist when it is safe to pass a parked or stationary vehicle, and/or to notify the driver or occupant of a vehicle of an oncoming bicycle or scooter. According to one or more embodiments, a method for a vehicle includes detect that a moving object is approaching the vehicle when the vehicle is stationary, providing an alert within the vehicle of the approaching moving object; preventing an actuation of a door latch from opening a door of the vehicle; and providing a visual alert to notify an operator of the moving object that an occupant of the vehicle is attempting to open the door of the vehicle.

In one or more embodiments, the method includes delaying the occupant from exiting the vehicle until an acknowledgment of the moving object from within the vehicle, the delaying including requiring a plurality of door latch attempts.

In one or more embodiments, the detecting that the moving object is approaching the vehicle includes receiving an indication of the moving object via a sensor positioned on the vehicle that the moving object is within an area having a diameter of between 15 and 20 meters around the vehicle, and receiving an oral indication, visual indication or haptic indication of the moving object via a sensor positioned on the vehicle.

In one or more embodiments, alerting the occupant within the vehicle of the approaching moving object includes providing a dashboard indication, providing a haptic indication, and providing a visual indication.

In one or more embodiments, a visual alert identifying the passing zone in the predefined area is a lighted area as a function of the acknowledgement wherein a color of the lighted area reflects a level of acknowledgement.

In one or more embodiments, preventing a door from opening may include determining if the occupant has not acknowledged the moving object for a first and second door latch attempt and allowing the door to open if the occupant attempts the door latch three or four times.

ILLUSTRATIVE EMBODIMENTS

The disclosure will be described more fully hereinafter with reference to the accompanying drawings, in which example embodiments of the disclosure are shown. This disclosure may however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates a vehicle 102 equipped to alert oncoming moving object 105, which may be a bicycle, scooter, a human being, an electric bicycle, a motorcycle, a skateboard, another vehicle or a hoverboard, and other road user represented by moving object 105 that may come in contact with a vehicle door 108 if an occupant of vehicle 102 opens a door expectantly. Vehicle 102 may be one of various types of vehicles with a chassis 103 and may be a petroleum-powered vehicle, an electric vehicle, a hybrid electric vehicle, or an autonomous vehicle, that is configured as a Level 2 or higher automated or semi-automated vehicle. For example, if vehicle 102 is in a parking lane or parking lot and vehicle 102 is stopped with occupants ready to exit, embodiments herein are directed to alert both occupants and an operator of moving object 105 of a door opening possibility.

In one or more embodiments, a vehicle computer 110 may perform various functions such as controlling engine operations (fuel injection, speed control, emissions control, braking, etc.), managing climate controls (air conditioning, heating etc.), activating airbags, and issuing alerts (check engine light, bulb failure, low tire pressure, vehicle in a blind spot, etc.). The vehicle computer 110, in one or more embodiments, may be used to support features such as passive keyless operations, remotely-controlled vehicle maneuvering operations, and remote vehicle monitoring operations. The vehicle computer 110 may further control some maneuvers performed by the vehicle 102 during the self-parking operation (referred to in the industry as a Remote Park Assist (RePA) operation).

The vehicle computer 110 may further include an Advanced Driver-Assistance System ("ADAS") enhancement system 125, which may communicate with an infotainment system 160 and display system 164. Vehicle 102, as one embodiment, may have various components that may be controlled, activated, and/or operated by the vehicle by the ADAS enhancement system 125.

Vehicle computer 110 further includes transceiver 114, and processor 104 wherein the processor 104 is configured to execute steps associated with detecting moving object 105 approaching prior to vehicle door 108 being opened. Processor 104 is shown coupled to memory 122, which is an example of a non-transitory computer readable medium which may be used to store the operating system (OS) 126, database 139, and various modules such as moving object detection module 130. The various modules may be in the form of computer-executable instructions executed by the processor 104 in accordance with the disclosure. More particularly, moving object detection module 130 may be executed by the processor 104 in accordance with the disclosure.

The memory 122 may be a non-transitory computer-readable memory storing unintentional activation detection program code as module 130. The memory 122 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In one or more embodiments, vehicle computer 110 is coupled to receive data over communications network 140, which may include a cellular or Wi-Fi communication link enabling vehicle 102 to communicate with a remote server 142, which may include a cloud-based network or source for transferring data in accordance with this disclosure. Also, shown is a mobile device 141, which may be in communication with network 140, remote server 142 and/or vehicle 102. In one or more embodiments, an operator of a moving object 105 may have a mobile device 141 capable of receiving a beacon or other alert from vehicle 102 generated by moving object detection module 130.

As shown, vehicle 102 may include a Vehicle Control Unit (VCU) 106 with vehicle perception system (VPS) 132 having a sensor system 112, which may communicate with cameras and other sensors 150 of vehicle 102 in a manner that allows the vehicle computer 110 to collect data therefrom to enable moving object detection module 130. Data may be transmitted from cameras and other sensors 150 via a controller area network (CAN) bus network. For example, bus 163 may be part of a CAN bus network, as will be appreciated by one of skill in the art.

Examples of the camera and other sensors 150 that may be included in the sensor system 112 may include motion sensors, radars and/or emitters capable of detecting objects, distances such as ultrasonic radar, LiDAR, cameras RF, and the like. In one or more embodiments, sensors/cameras 150 may further include one or more of Bluetooth®-enabled sensors, or Bluetooth® low energy (BLE)-enabled sensors, accelerometers, rate sensors, GPS sensors, and steering wheel sensors. Camera/sensors 150 may include rear-facing cameras or 360 degree cameras such as sensors capable of detecting moving object 105 approaching vehicle 102. In one or more embodiments, the sensors may include cameras capable of sending data to displays within vehicle 102, such as over CAN bus 163 or over network 140, in accordance with system requirements.

In one or more embodiments, moving object detection module 130 receives data from sensor system 112 using wired or wireless communications or direct input of data from sensors 150, and determines whether moving object 105 is within a 15 to 20 meter zone 107 or quickly approaching such a zone. This may be achieved using time of flight or other techniques for determining the distance to an object, as well as using computer vision and other video/image analysis techniques for identifying the object as a bicyclist, scooter, pedestrian, etc. For example, an exterior-facing camera (a sensor 150) may capture images or video that may be presented on display 109 or display system 164, which video/images may include the moving object 105 that is entering or has entered zone 107, in which case the moving object detection module may determine that an acknowledgment by an occupant of vehicle 102 of moving object 105 is desirable to prevent an untimely opening of a door of the vehicle.

In some aspects, VCU 106 may include a plurality of Engine Control Module (ECM) 124 disposed in communication with computer 110.

Network 140 illustrates an example communication infrastructure in which connected devices discussed in various embodiments of this disclosure may communicate, for example, to communicate driver profiles stored in server 142. The network(s) 140 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples. In some aspects, the vehicle computer 110 may be in communication with one or more server(s) 142. Server 142 may be part of a cloud-based computing infrastructure and may be associated with and/or include a Telematics Service Delivery Network (SDN) that provides digital data services to the vehicle 102 including driver profiles and the like.

In accordance with some aspects, VCU 106 may share a power bus with the vehicle computer 110, such as bus 163, and may be configured and/or programmed to coordinate the data between vehicle 102 systems, connected servers (e.g., the server(s) 142), and other vehicles (not shown in FIG. 1). VCU 106 can include or communicate with any combination of the electronic control units/modules, such as, for example, a Body Control Module (BCM) 123, an Engine Control Module (ECM) 124, a Transmission Control Module (TCM) 136, a telematics control unit (TCU) 128, etc.

The TCU 128 can be configured and/or programmed to provide vehicle connectivity to wireless computing systems onboard and off board the vehicle 102, and may include a Navigation (NAV) receiver 135 for receiving and processing a GPS signal, a BLE® Module (BLEM) 138, a Wi-Fi transceiver, a UWB transceiver, and/or other wireless transceivers (not shown in FIG. 1) that may be configurable for wireless communication between the vehicle 102 and other systems, computers, and modules. The TCU 128 may be disposed in communication with the electronic control units by way of a bus.

In one or more embodiments, the electronic control units/modules, may control aspects of vehicle operation and communication using inputs from human drivers, inputs from an autonomous vehicle controller, and/or via wireless signal inputs received from other connected devices, such as server(s) 142, among others.

The BCM 123 generally controls integration of sensors, vehicle performance indicators, and variable reactors associated with vehicle systems, and may include processor-based power distribution circuitry that can control functions associated with the vehicle 102 body such as lights, windows, security, camera(s), audio system(s), speakers, display system, door locks and access control, vehicle energy management, and various comfort controls. The BCM 123 may also operate as a gateway for bus and network interfaces to interact with remote electronic control units/modules (not shown in FIG. 1).

In some aspects, the ADAS system 125 may provide Level-1 through Level-3 automated driving and driver assistance functionality that can include, for example, active parking assistance, trailer backup assistance, adaptive cruise control, lane keeping, and/or driver status monitoring, among other features. ADAS system 125 may also provide aspects of user and environmental inputs usable for user authentication and prevent drivers and other occupants from opening door 108 into a moving object 105 via moving object detection module 130.

The ADAS system 125 can further obtain input information via the vehicle sensor system 112, which may include sensors 150 disposed on the vehicle interior and/or exterior. The ADAS system 125 may receive the sensor information associated with driver functions, vehicle functions, and environmental inputs, and other information.

In some aspects the vehicle computer 110 may include an infotainment system 160 that may include a touchscreen interface portion as display system 164, and may include voice recognition features, biometric identification capabilities that can identify users based on facial recognition, voice recognition, fingerprint identification, or other biological identification means.

It should be readily understood that the computing environment depicted in FIG. 1 is an example of a possible implementation according to the present disclosure, and thus, it should not be considered limiting or exclusive.

In accordance with one or more embodiments, the moving object detection module 130 may be executed as part of and/or integrated within and/or operation in conjunction with components of the VCU 106, such as with the BCM 123 and sensor system 112. Thus, sensors 150 such as radars and cameras mounted upon vehicle 102 allows the vehicle computer 110 to communicate with vehicle systems and sensor system 112 to collect data. Examples of sensors include radars and/or emitters capable of detecting objects, distances such as ultrasonic radar, lidar cameras and the like. Sensor system 112 may further connect to one or more of Bluetooth®-enabled sensors, or Bluetooth® low energy (BLE)-enabled sensors, wheel speed sensors, accelerometers, rate sensors, GPS sensors, and steering wheel sensors. In one or more embodiments, the sensors 150 coupled to sensor system 112 may include driver state monitoring cameras (DSMC), interior, passenger and occupant cameras, lidar sensors, radar sensors, ultrasonic sensors, and Ultra-Wideband (UWB) sensors. Sensors 150 may also include exterior-faced cameras, such as sensor 150 shown located at the rear of the vehicle. Sensors 150 also include a dashboard installed interior camera, which may be associated with a DSMC system.

BCM 123 further controls various subsystems of vehicle 102 and provides moving object detections to moving object detection module 130. For example, BCM 123 may control whether a door latch is actuated, also referred to as a door "click", and can detect the number of clicks on each door. If no moving object 105 is detected, the moving object detection module 130/BCM 123 may not interrupt or delay opening of a door 108. Alternatively, moving object detection module 130/BCM 123 may require an occupant to actuate or click the door a number of times before the door opens to delay its open and/or to alert the occupant to the possibility of a moving object right outside the door they are seeking to open.

The BCM 123 is coupled to circuits to, for example, drive relays (e.g., to control wiper fluid, etc.) drive brushed direct current (DC) motors (e.g. to control power seats, power locks, power windows, wipers, etc.) drive stepper motors and/or drive LEDs, etc. In some examples, BCM 123 is coupled or integrated with moving object detection module 130 such that when a vehicle system controlled by BCM 123 is activated, sensors 150 and BCM 123 communicate that the moving object 105 is present with zone 107, and prevent power locks from opening unless a predetermined number of clicks occur in accordance with moving object detection module 130.

In one example, moving object detection module 130/BCM 123 may further be coupled to LED illumination on the outside of vehicle 102 such that when moving object detection module 130 detects the moving object 105 within zone 208 it may not only prevents power locks from allowing an occupant from opening a door 108 into the path of the moving object 105, it may also, or in the alternative, actuate the LED illumination to notify the bicyclist, for instance, that they should not pass the vehicle on that side and/or to be cautious, as further explained below.

Figure 2A:
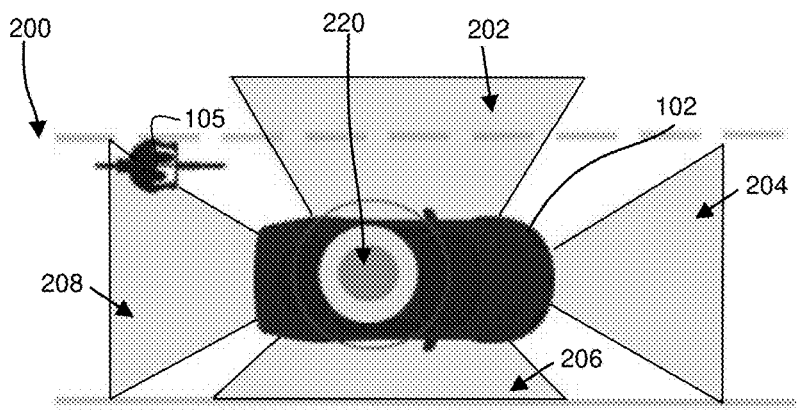
FIG. 2A illustrates a diagram of a vehicle and a moving object approaching the vehicle in accordance with an embodiment of the disclosure.

Referring now to FIG. 2A, a diagram illustrates vehicle 102 and moving object 105. An embodiment provides for individually illuminating different one or more zones 202, 204, 206 and 208 around vehicle 102 to provide visual messaging to moving object 105. This may be achieved with LED lighting on the vehicle such as on a headliner or roof area and/or existing brake and reverse lights on a vehicle. Each of the zones may be illuminated in green, yellow or red, or any other color as desired, and the lights may be active, in that they can provide visual effects such as flashing of scrolling. As shown, a 360 degree camera 220 (as well as other cameras and sensors 150 shown in in FIG. 1) may enable identification and ranging of the moving object 105. As shown in FIG. 2A, the illumination of area 202 may be larger than area 206 due to the likelihood of a moving object approaching being higher in area 202. In other embodiments, for example in countries for which drivers are on the right side of a vehicle and parking is on the left side of the street, the larger area may be on the opposite side.

In one or more embodiments, sensors 150, including camera 220 detect moving object 105 approaching, detect door latch attempts and the like.

Figure 2B:
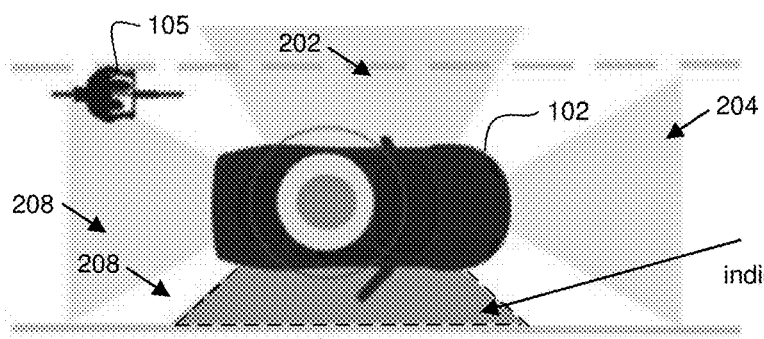
FIG. 2B illustrates a diagram of a vehicle and a moving object approaching the vehicle in accordance with an embodiment of the disclosure.

Referring now to FIG. 2B, vehicle 102 is shown with a door opening and 206 area illuminated, for example with red LED lights in area 216 could be blinking LED indicating an AWARENESS MESSAGE. In one embodiment, the LED lights are blinking. For example, if an occupant acknowledges that an oncoming moving object is in zone 202, moving object 105, being permissable for a passing zone 202, may see a green LED or no LED illumination, while zone 206, may have an occupant ready to exit (as may be detected by actuation of a door latch) and flashes red. In one embodiment, zone 202 is not illuminated green for a moving object unless an occupant acknowledges the presence of the moving object 105. In another embodiment, if there is no acknowledgement, and a door latch actuation is attempted, then vehicle 102 may illuminate a red zone in area 202 to alert moving object 105.

Figure 2C:
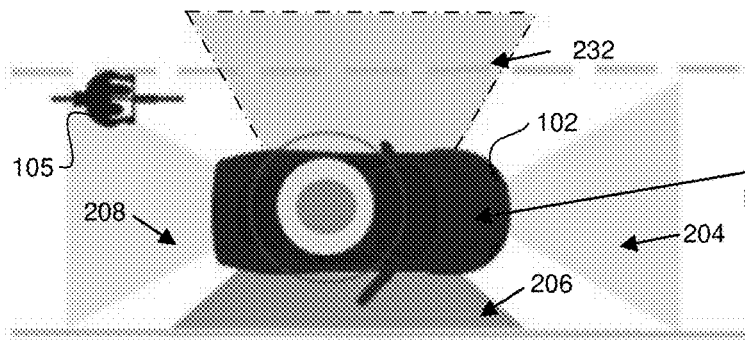
FIG. 2C illustrates a diagram of a vehicle and a moving object approaching the vehicle in accordance with an embodiment of the disclosure.

Referring to FIG. 2C, area 232 is illuminated to indicate that an area is green after it is confirmed that an occupant has acknowledged an alert. Thus, when AWARENESS MESSAGE acknowledged then alert level is changed to INFORM as shown by message 236. Alternatively, even with an acknowledgement, a door latch actuation may be delayed by a number of clicks and a yellow light illuminated.

Figure 2D:
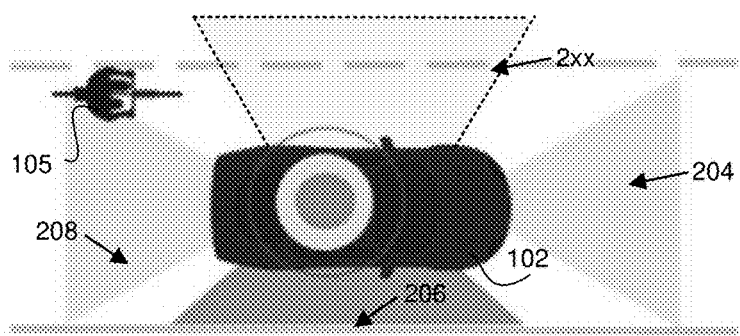
FIG. 2D illustrates a diagram of a vehicle and a moving object approaching the vehicle in accordance with an embodiment of the disclosure.

Referring to FIG. 2D, when a driver does not acknowledge an AWARENESS MESSAGE and attempts to engage a vehicle door, a blinking LED indicating an ALERT may be activated in one or more embodiments. Thus, in one embodiment, area 240 may be blinking yellow to alert object 105 and area 206 may be blinking red to indicate that a door latch was actuated. Further, area 208 and 204 may also display color illumination if a door latch is actuated to provide further alerts.

Figure 2E:
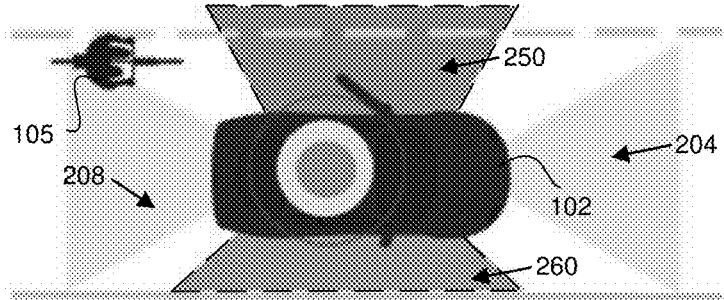
FIG. 2E illustrates a diagram of a vehicle and a moving object approaching the vehicle in accordance with an embodiment of the disclosure.

Referring to FIG. 2E, when an occupant/driver ignores an ALERT and advances a vehicle door to engage so that the number of actuations reaches a maximum such as 3 or 4, in one embodiment, an LED indicator is actuated to ALERT status and red lights may be illuminating area 250 and in some embodiments, area 260. In other embodiments, depending on system requirements, areas 204 and 208 may further be illuminated in an alerting color such as red.

Referring back to FIG. 2A, in one or more embodiments, the color of a light illuminating zone 202 or 206 may be a function of the number of clicks or door latch attempts made. For example, if an acknowledgement is made but door latch attempts occur despite the acknowledgement, a yellow or red zone illumination may occur as shown in FIG. 2D. In one embodiment, the zones shown in FIGS. 2A-2E may be flashing red lights or include a bright flashing light during the day similar to an alert provided by traffic lights when emergency vehicles approach an intersection to provide a signal to any moving object 105 in the vicinity of an impending door opening.

In one or more embodiments, an alert level is provided to occupants and a driver in vehicle 102 to enable the occupants to acknowledge moving object 105 and reflect the acknowledgement on a display, such as display 109 or display system 164 shown in FIG. 1.

Figure 3:
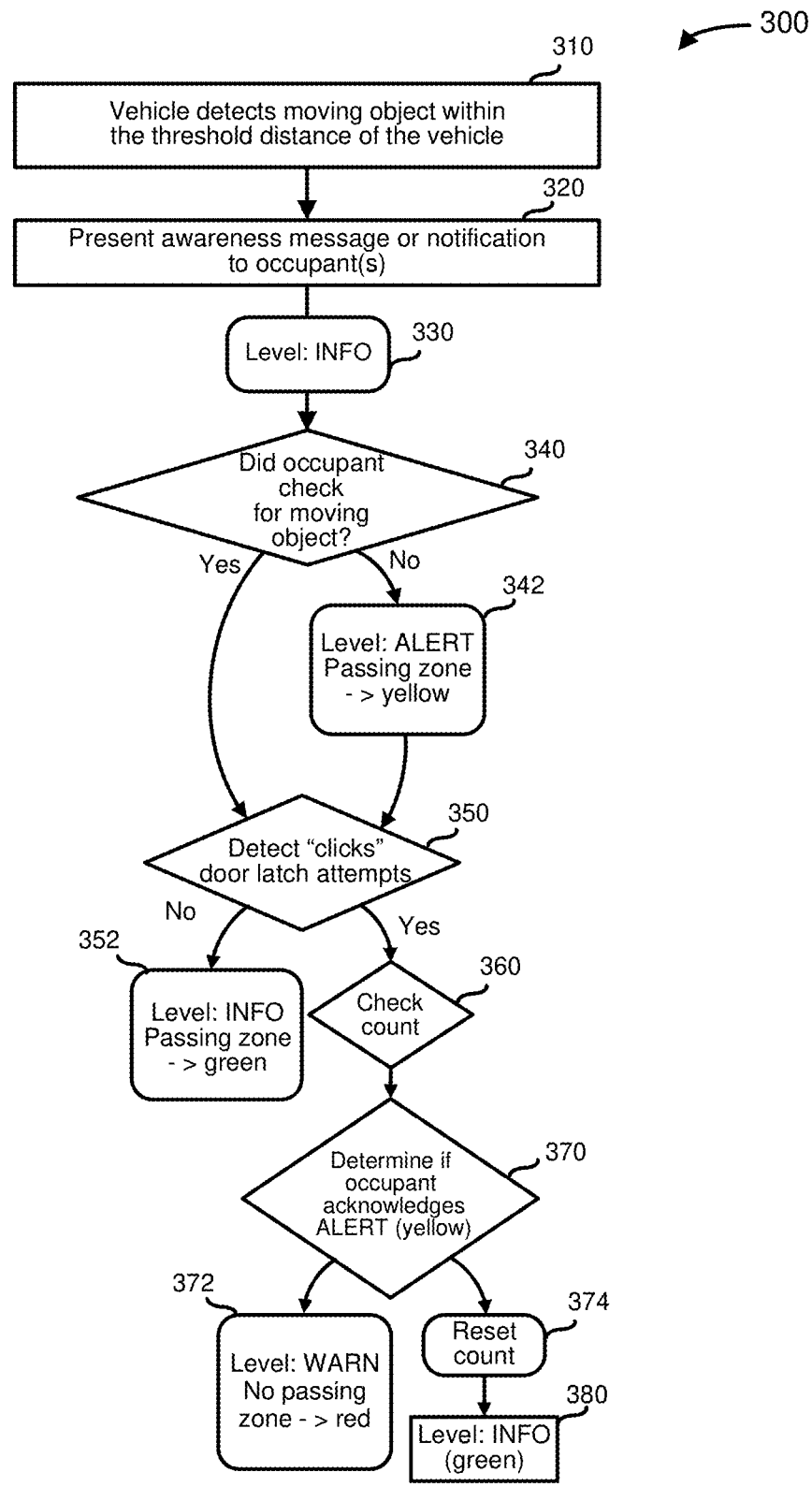
FIG. 3 illustrates a decision flow diagram in accordance with an embodiment of the disclosure.

Referring now to FIG. 3, a decision flow diagram illustrates a solution to prevent unwanted interactions, between moving objects and vehicle car doors. As shown at block 310, a system for detecting that a moving object, such as a bicycle or scooter is in an area that is less than or equal to an alert distance threshold is provided. For example, a threshold area may be 15 to 20 meters surrounding vehicle 102. At block 320 an awareness message is activated, for example, on the display 109, a dashboard display or a heads up display a message or notification may be presented indicating that a moving object is within the threshold area. Block 320 provides for presenting an awareness message to occupants.

Block 330 provides displaying information to occupants and requesting an acknowledgement.

Decision block 340 asks whether an occupant acknowledged or checked for the moving object. For example, a driver may turn her head to look for a bicyclist, as may be detected by a driver sensor system, and/or the driver or other occupant may provide an acknowledgment, such as a verbal indication or gesture acknowledging the moving object will be assumed. In another example, display system 164, for instance, may allow a driver or other occupant to acknowledge the presence of a moving object by touching the display.

Block 342 provides, that if no acknowledgement is received or determined, then a visual alert or notification may be provided to a moving object such as a bicyclist using exterior lighting or an audible notification may be provide, such as by a horn associated with the vehicle. Thus block 342 provides display ALERT and illuminate area. For example, a "yellow" light on the exterior of the vehicle may be displayed including a yellow illumination on the ground about one or both sides of the vehicle 102 indicating a "passing zone". LEDs surrounding vehicle 102 may have different colors to enable a yellow, red or green zone about vehicle 102. In one or more embodiments, a yellow LED illumination in a passing zone may indicate an alert. A red colored LED illumination in a passing zone indicates a "no pass" zone.

If there was an acknowledgement determined at block 340, or after the illumination of the passing zone at block 342, then decision block 350 asks if the door latch is being "clicked," by asking "did occupant attempt door latch?" meaning that an occupant is trying to open a door by actuating the latch while a moving object is within the 15 to 20 meter area surrounding vehicle 102. For example, in one embodiment, vehicle 102 senses whether doors are being opened by detecting attempts at the door latch of each door, via sensors 150 and or mechanisms associated with each door, as controlled by the BCM 123. In one embodiment, module 130 receives an indication from BCM 123 and transmits a message to illuminate areas and provide alerts.

If there are no door latch attempts made, block 352 provides for displaying an ALERT and illuminate an area. For example, illuminating a "green" passing zone using the exterior lighting of the vehicle to indicate to any operators of moving object 105 that imminent door opening will be taking place. Vehicle 102 may have an LED strip or lighting that illuminates a passing zone, which might be green in color.

If door latch attempts occur, block 360 checks the count of the "clicks." The door may be prevented from opening until a threshold number of attempts, or click, to bring the occupant's awareness to the moving object and notifications presented by the vehicle. For instance, it may take three attempts to open the door if the vehicle has detected a moving object at block 310, subject to the outcome of decision block 340. At block 370 it is determined if an occupant acknowledges the alert noted in block 342. If not, then block 372 provides for an alert including a "no passing zone" message to the bicyclist via illuminating an area on one or both sides of the vehicle with red lighting. If it is determined at block 370 that the occupant acknowledged an alert at block 342, then block 374 will reset the counter and the vehicle will message that it is permissable to pass by the vehicle, such as via illuminating an area on one or both sides of the vehicle as green.

Figure 4:
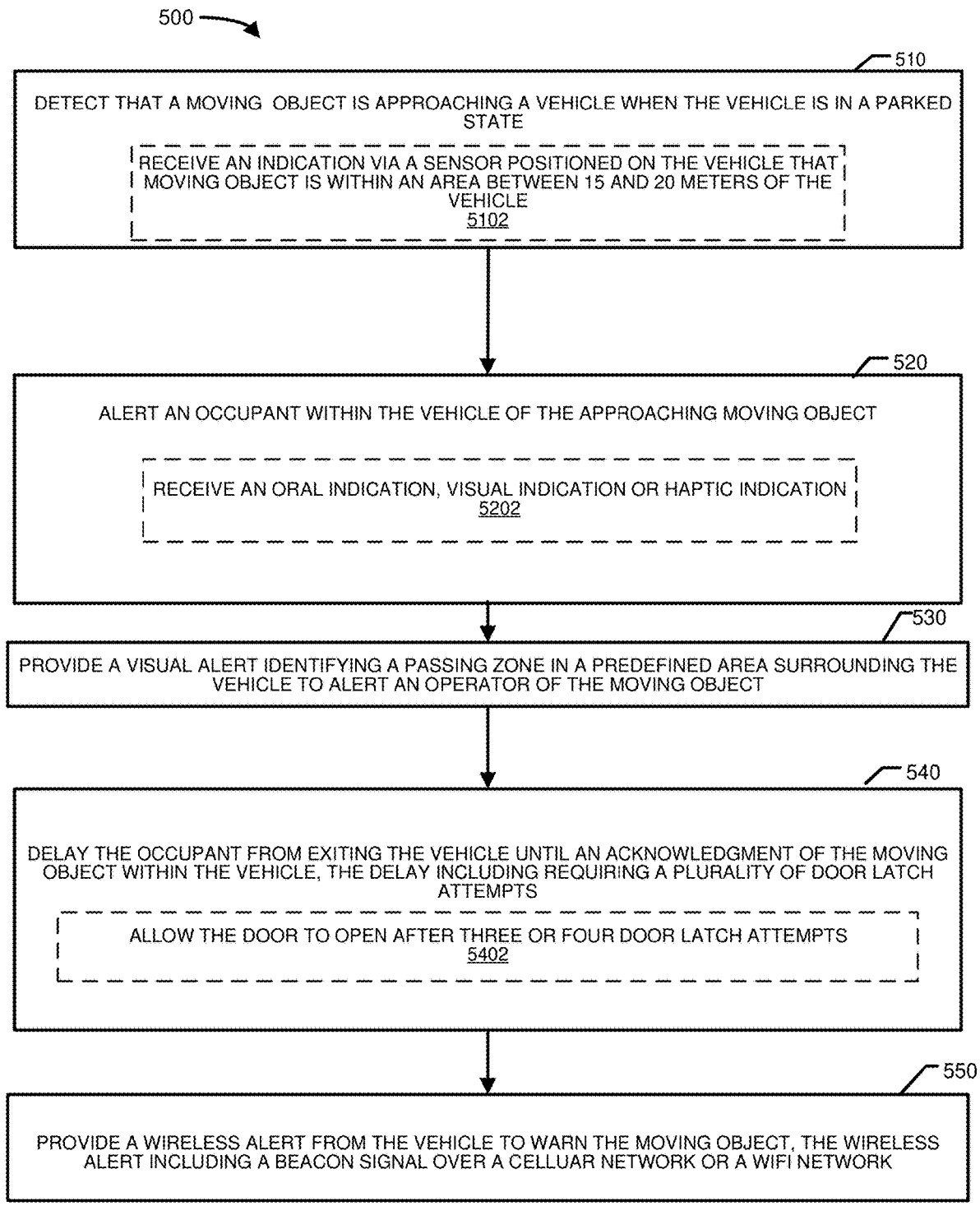
FIG. 4 illustrates a flow diagram of a method in accordance with an embodiment of the disclosure.
Figure 5:
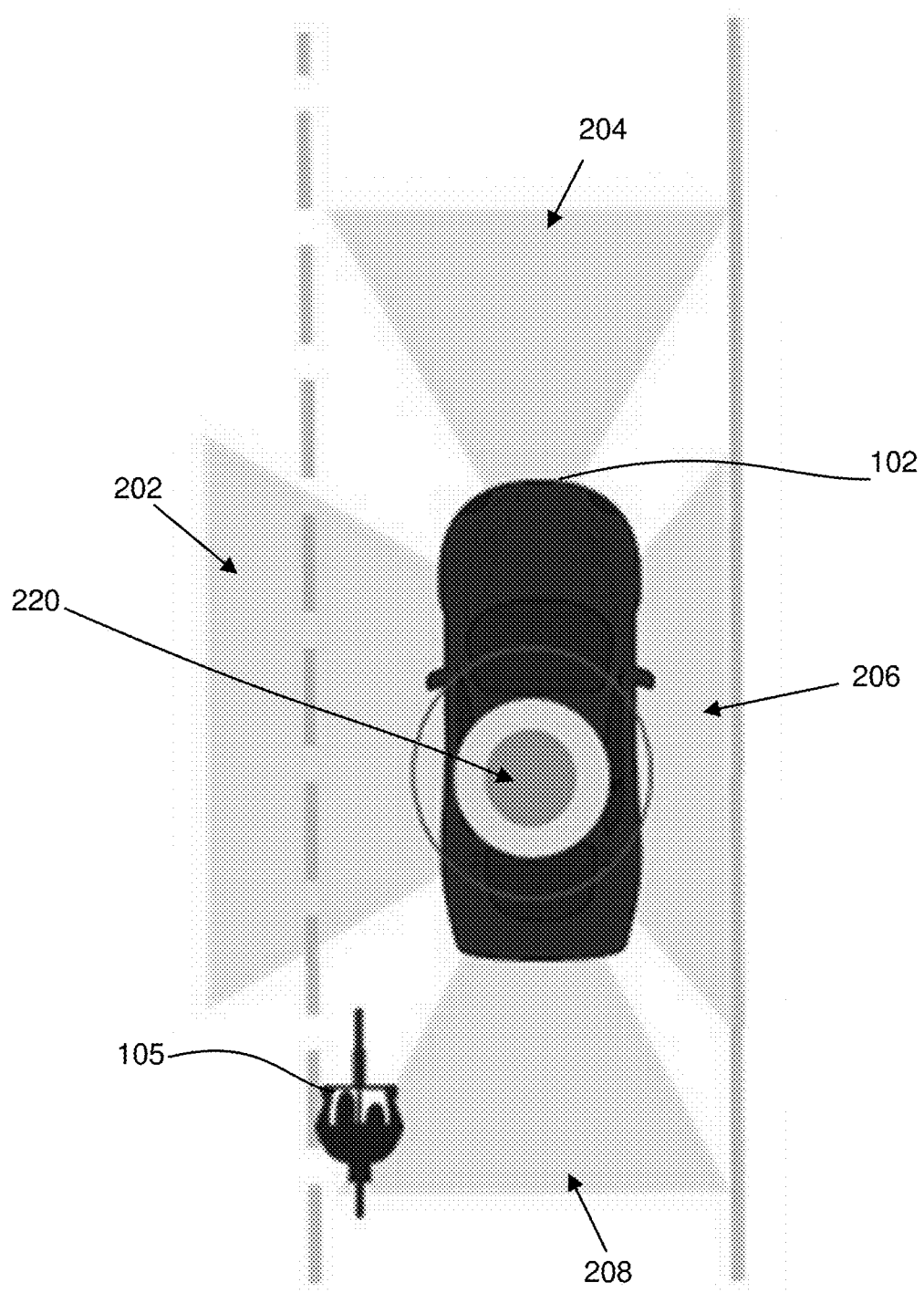
FIG. 5 illustrates a vehicle and a moving object approaching the vehicle in accordance with an embodiment of the disclosure.

Referring now to FIG. 4, a flow diagram 500 illustrates a method in accordance with an embodiment. Block 510 provides for detecting that a moving object is approaching a vehicle when the vehicle is stationary. For example, as shown in FIGS. 1 and 5, vehicle 102 will detect moving object 105 when sensors 150 detect that moving object is within a zone 107 after vehicle 102 has parked. Within block 510 is optional block 5102 which provides for receiving an indication via a sensor positioned on vehicle that moving object is within an area having a diameter of between 15 and 20 meters around vehicle. For example, zone 107 may be an area having a diameter of 15 and 20 meters. In one embodiment, sensors may include a 360 degree camera on top of vehicle 102. Thus, detecting the moving object 105 within the area around the vehicle may include displaying an image or video of the moving object 105 on display 109 or display system 164.

Block 520 provides for providing an alert within the vehicle of the approaching moving object. For example, infotainment system 160 and display system 164 and display 109 may provide an interactive display that enables an alert to occupants including a driver of vehicle 102. Within block 520 is block 5202 which provides for receiving an oral indication, visual indication or haptic alert or feedback. For example, infotainment system 160 and display system 164 and display 109 may include speakers and display to provide an oral indication and a visual display. In one embodiment, haptic alerts may include shaking of a steering wheel or seating to provide an alert. The haptic alert may be in combination with an interactive display asking the driver or other occupant to acknowledge the detected moving object 105.

Block 530 provides for preventing an actuation of a door latch from opening a door of the vehicle. For example, module 130 may receive an indication of the presence of a moving object in a zone shown in FIGS. 2A-2E and provide an instruction to door latch actuators to begin a count as shown in FIG. 3 to count to 3 or 4 before allowing an actuation of a door latch.

Block 540 provides for providing a visual alert to notify an operator of the moving object that an occupant of the vehicle is attempting to open the door of the vehicle. For example, as shown in FIGS. 2A-2E, a visual alert may include illuminating one or more of areas 202, 204, 206 and 208. In another embodiment a visual alert may include presenting an image of the moving object on a display of the vehicle. For example, if an occupant acknowledges moving object 105, each area may be lit green, to illuminate a passing zone. If an acknowledgement is not received, a red light may flash in areas 202 or 206. If an acknowledgement is made, zones 202 or 206 may be illuminated with a green light or a yellow light depending on system requirements. If an occupant acknowledges a message such as an "awareness" message and checks on a side-view mirror for the oncoming moving object 105, a passing zone may be lit green and an alert level may be displayed as an "information" level rather than an alert level. If an occupant forgets to acknowledge or attempts to open a door but is delayed, a yellow area may be lit by the door where the door latch was attempted but prevented from opening. A display may provide an alert in a scenario in which a door latch was attempted. In one or more embodiments, if a maximum number of door latch attempts, or "clicks" occurs, a red illuminated area around each of area and an alert may be displayed.

In one or more embodiments, the illuminated area may be generated from LED strips located below vehicle 102 or along a perimeter located above the doors to permit the area illuminated to be seen by moving object 105. Further, LED strips may be located in the rear of vehicle 102 near rear lighting such as turn signals and brake lights.

Block 5402 provides for allowing the door to open after three or four door latch attempt. For example, in one embodiment, vehicle 102 delays the occupant from exiting the vehicle until an acknowledgement of the moving object 105, the delay including requiring a plurality of door latch attempts. For example, an acknowledgement may include receiving an oral or touch response from a driver or other occupant that moving object 105 is within a predefined area. In one embodiment, an acknowledgement may include identifying whether a driver checked the rear-view or blind spot mirror with the eye tracking hardware. For example, driver state monitoring cameras (DSMC) may be within vehicle 102 capable of working with moving object detection module 130. Within block 540 is optional block 5402 shown in dashed lines that provides for allowing the door to open after three or four door latch attempts. For example, if a driver wishes to exit vehicle 102, and acknowledges a moving object 105 approaching within zone 202 as shown in FIG. 2A in one embodiment, the driver may exit after making three door latch attempts even after acknowledging that a moving object is approaching. In another embodiment, an occupant, for example, an occupant in the rear of vehicle 102 may be prevented from exiting vehicle 102 until four door latch attempts are made.

Block 550 illustrates providing a wireless alert from the vehicle to alert the moving object, the wireless alert including a beacon over a cellular network, a Bluetooth connection or a Wi-Fi connection. For example, vehicle 102 may be output over transceiver 114 a beacon over a short distance capable of being received by mobile device 141 or over network 140 to mobile device 141 generated by moving object detection module 130.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CD-ROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a vehicle, that a moving object is approaching the vehicle when the vehicle is stationary, wherein the moving object is in a first zone around the vehicle;
   providing, by the vehicle, an alert within the vehicle indicating presence of the moving object in the first zone;
   preventing, by the vehicle, opening of a first door of the vehicle proximate to the first zone;
   detecting, by the vehicle, opening of a second door of the vehicle proximate to a second zone around the vehicle, the second zone being opposite to the first zone;
   providing, by the vehicle, a first visual alert including light output of a first color to notify an operator of the moving object that an occupant of the vehicle is attempting to open the first door of the vehicle;
   providing, by the vehicle, a second visual alert external to the vehicle, the second visual alert including light output of a second color different from the first color;
   allowing, by the vehicle, opening of the second door;
   detecting, by the vehicle, a plurality of attempts to open the first door;
   receiving, by the vehicle, acknowledgement of the alert;
   determining, by the vehicle, that the plurality of attempts exceed a threshold; and
   allowing, by the vehicle and based on the acknowledgement of the alert and the plurality of attempts exceeding the threshold, opening of the first door.

2. The method of claim 1 wherein the detecting that the moving object is approaching the vehicle when the vehicle is stationary further comprises:
   determining the moving object is within a threshold distance of the vehicle.

3. The method of claim 1 wherein the providing an alert within the vehicle of the approaching moving object further comprises:
   presenting an image of the moving object on a display of the vehicle.

4. The method of claim 1 wherein providing the alert further comprises:
   providing at least one of a dashboard alert, a haptic feedback, or a visual indication.

5. The method of claim 1 wherein the providing the visual alert to notify the operator of the moving object further comprises:
   providing an illuminated area on a ground adjacent a side of the vehicle.

6. The method of claim 5 wherein a color of the illuminated area is indicative of a level of a risk that the door of the vehicle may be opened.

7. The method of claim 1 further comprising:
   allowing a subsequent actuation of the door latch to open the door of the vehicle after the moving object has passed.

8. The method of claim 1 wherein the providing the visual alert further comprises providing the visual alert on a side of the vehicle from where the door latch was actuated.

9. The method of claim 1 wherein the moving object is a bicycle, a scooter, a human being, an electric bicycle, a motorcycle, a skateboard, another vehicle or a hoverboard.

10. The method of claim 1 further comprising:
    providing a wireless alert from the vehicle to alert the moving object, the wireless alert including a beacon signal over a cellular network, Bluetooth connection, or a Wi-Fi network.

11. A system for a vehicle comprising:
    a plurality of sensors coupled to the vehicle;
    a memory coupled to the plurality of sensors that stores computer-executable instructions; and
    a processor coupled to the memory, the processor configured to access the memory and execute the computer-executable instructions to:
        detect that a moving object is approaching the vehicle when the vehicle is stationary, wherein the moving object is in a first zone proximate to the vehicle;
        provide an alert within the vehicle indicating presence of the moving object;
        prevent a first door of the vehicle from opening, the first door being proximate to the first zone;
        provide a first visual alert to notify an operator of the moving object that an occupant of the vehicle is attempting to open the first door of the vehicle, the first visual alert including light having a first color;
        detect opening of a second door of the vehicle, the second door being proximate to a second zone around the vehicle, the second zone being opposite to the first zone;
        provide a second visual alert external to the vehicle, the second visual alert including a light having a second color different from the first color;
        allow opening of the second door;
        detect a plurality of attempts to open the first door of the vehicle;
        determine that the plurality of attempts exceed a threshold; and allow opening of the first door of the vehicle based on acknowledgment of the alert and the plurality of attempts exceeding the threshold.

12. The system of claim 11, wherein the processor configured to execute instructions to detect that the moving object is approaching the vehicle when the vehicle is stationary, further executes instructions to:

receive an indication of the moving object via the sensors positioned on the vehicle that the moving object is within an area having diameter between 15 and 20 meters around the vehicle.

13. The system of claim 11, wherein the processor configured to execute instructions to provide the alert within the vehicle of the approaching moving object further executes instructions to:

receive a oral indication, visual indication or haptic indication of the moving object from the sensors positioned on the vehicle.

14. The system of claim 11, wherein the processor configured to execute instructions to provide an alert within the vehicle of the approaching moving object further executes instructions to:

provide a dashboard indication, a haptic indication, or a visual indication of the moving object via the sensors positioned on the vehicle.

15. The system of claim 11, wherein the processor configured to provide the visual alert to notify the operator of the moving object that the occupant of the vehicle is attempting to open the door of the vehicle is further configured to:

provide a lighted area as a function of an acknowledgement of the moving object by the occupant of the vehicle, wherein a color of the lighted area reflects a level of acknowledgement.

16. The system of claim 15 wherein the lighted area is green after the acknowledgement is received, yellow to indicate passing with care, and red to indicate the acknowledgement was not received.

17. The system of claim 11, wherein the processor is further configured to:

provide a wireless alert message from the vehicle to alert the moving object, the wireless alert message including a beacon signal over a cellular network or Wi-Fi network.

18. A vehicle comprising:
a chassis;
a motor coupled to the chassis;
a computer coupled to the chassis, the computer including a memory and a processor coupled to the memory, the processor configured to execute one or more instructions to:
  detect that a moving object is approaching the vehicle when the vehicle is stationary, the moving object being located in a first zone around the vehicle;
  provide an alert within the vehicle indicative of the moving object;
  detect opening of a first door of the vehicle proximate to a second zone around the vehicle, the second zone being opposite to the first zone;
  prevent a second door of the vehicle from opening, the second door being proximate to the first zone;
  allow the first door to be opened;
  provide a first visual alert to notify an operator of the moving object that an occupant of the vehicle is attempting to open the second door of the vehicle, the first visual alert including a light having a first color;
  provide a second visual alert external to the vehicle and within the second zone, the second visual alert including a light having a second color different from the first color;
  detect a plurality of attempts to open the second door;
  determine that the plurality of attempts exceed a threshold; and
  allow opening of the second door based on detecting an acknowledgement of the alert and the plurality of attempts exceeding the threshold.

* * * * *